RAMP ASSEMBLY

Filed Dec. 26, 1968 8 Sheets-Sheet 1

INVENTORS
JOHN C. ABROMAVAGE
HENRY S. SHATTLES
BY Semmes and Semmes
ATTORNEYS

INVENTORS
JOHN C. ABROMAVAGE
HENRY S. SHATTLES
BY Semmes and Semmes
ATTORNEYS

INVENTORS
JOHN C. ABROMAVAGE
HENRY S. SHATTLES

BY Semmes and Semmes
ATTORNEYS

RAMP ASSEMBLY

INVENTORS
JOHN C. ABROMAVAGE
HENRY S. SHATTLES

BY Semmes and Semmes
ATTORNEYS

INVENTORS
JOHN C. ABROMAVAGE
HENRY S. SHATTLES
BY Semmes and Semmes
ATTORNEYS

RAMP ASSEMBLY

Filed Dec. 26, 1968 8 Sheets-Sheet 6

INVENTORS
JOHN C. ABROMAVAGE
HENRY S. SHATTLES
BY Semmes and Semmes
ATTORNEYS

RAMP ASSEMBLY

Filed Dec. 26, 1968 8 Sheets-Sheet 7

INVENTORS
JOHN C. ABROMAVAGE
HENRY S. SHATTLES
BY Semmes and Semmes
ATTORNEYS

RAMP ASSEMBLY

Filed Dec. 26, 1968 8 Sheets-Sheet 8

INVENTORS
JOHN C. ABROMAVAGE
HENRY S. SHATTLES
BY Semmes and Semmes
ATTORNEYS

United States Patent Office 3,511,393

Patented May 12, 1970

3,511,393

RAMP ASSEMBLY

John C. Abromavage, Tempe, and Henry S. Shattles, Phoenix, Ariz., assignors to Arcoa, Incorporated, Phoenix, Ariz., a corporation of Oregon Filed Dec. 26, 1968, Ser. No. 787,188
Int. Cl. B60p *1/00*
U.S. Cl. 214—85 10 Claims

ABSTRACT OF THE DISCLOSURE

Automotive vehicles, particularly an extensible loading ramp assembly which is supported upon the vehicle chassis and is extensible through the rear of the vehicle.

BACKGROUND OF THE INVENTION

Field of the invention

Earlier inventors have given a great deal of attention to the development of loading ramp assemblies which could be transported upon a truck bed and extended from the truck bed rear to the ground so as to assist in loading of the truck. A principal shortcoming of these earlier ramp assemblies have been their complexity, as well as their space-consuming characteristics. Normally, the ramp when withdrawn from the ground has been supported on top of the truck bed, thereby interferring with storage of material upon the truck. This latter difficulty is compounded when the ramp is used within a closed truck, such as is used in the truck rental industry.

Attempts at solving these ramp storage problems have included provision of a ramp storage space intermediate the vehicle chassis top and the truck bed. However, this accommodation has either increased the vehicle height or limited storage space, while weakening the vehicle chassis.

Description of the prior art

Prior art references include:

Harley, 276,685; Leach, 860,752; Niswanger 1,103,155; Huwyler, 1,346,891; Pflaum, 1,758,372; Slater, 2,082,663; Ratcliffe, 2,169,661; Terry, 2,398,730; Kelberer, 2,457,-380; Ferguson, 2,900,094.

Harley shows a jointed skid supported conventionally between a railroad freight car chassis and the car bed. However, Harley does not suggest locking means, either locking the ramp in storage or locking the ramp in its extended position and Harley does not suggest means for rotatably supporting the ramp, so as to assist in withdrawal.

Leach shows a railroad baggage car skid similar to Harley, but without joints.

Niswanger shows a ramp which can be rested upon the vehicle rear.

Huwyler shows a railway car having a laterally extensible loading ramp.

Pflaum shows a truck with rear ramp of the conventional type.

Slater shows a sliding reach and sleeve for truck beds, the reach being secured on top of the truck bed.

Ratcliffe shows a tipping load carrying platform for an automobile wrecker vehicle, the load platform being supported upon the truck bed.

Terry shows a pivoting ramp for supporting a structure.

Kelberer shows a lateral ramp for use with a truck bed. The ramp being supported between the truck bed and the vehicle chassis consuming extra space and without means for positively locking the ramp either in its storage position or in its extended position.

Ferguson shows a ramp device attachable to the rear of a heavy equipment tractor-trailer combination, the ramp being folded upon the trailer rear.

SUMMARY OF THE INVENTION

According to the present invention, a vehicle is provided with a ramp that has a wheeled yoke pivoted at its inner or rear end. The wheels of the pivoted yoke are guided in a pair of tracks running parallel to the vehicle chassis. As the ramp is withdrawn, the wheels provide rotatable support along the track and stop limits are provided for locking the ramp in storage position within the vehicle and limiting withdrawal of the ramp in its extended position. In the principal mode of the invention the ramp and tracks are supported interiorly of the chassis trusses, so as to avoid taking up extra storage space and the ramp itself is provided with a resilient midsection which engages the vehicle differential to provide a frictional stop. The proposed construction actually strengthens the chassis to the extent that lateral torque and longitudinal yawing of the chassis is avoided, even though the ramp is stored entirely within the chassis.

In a modification of invention, the entire ramp assembly is supported above the chassis and provided with elaborate locking features.

DESCRIPTION OF THE PREFERRED EMBODIMENTS

Figure 1:
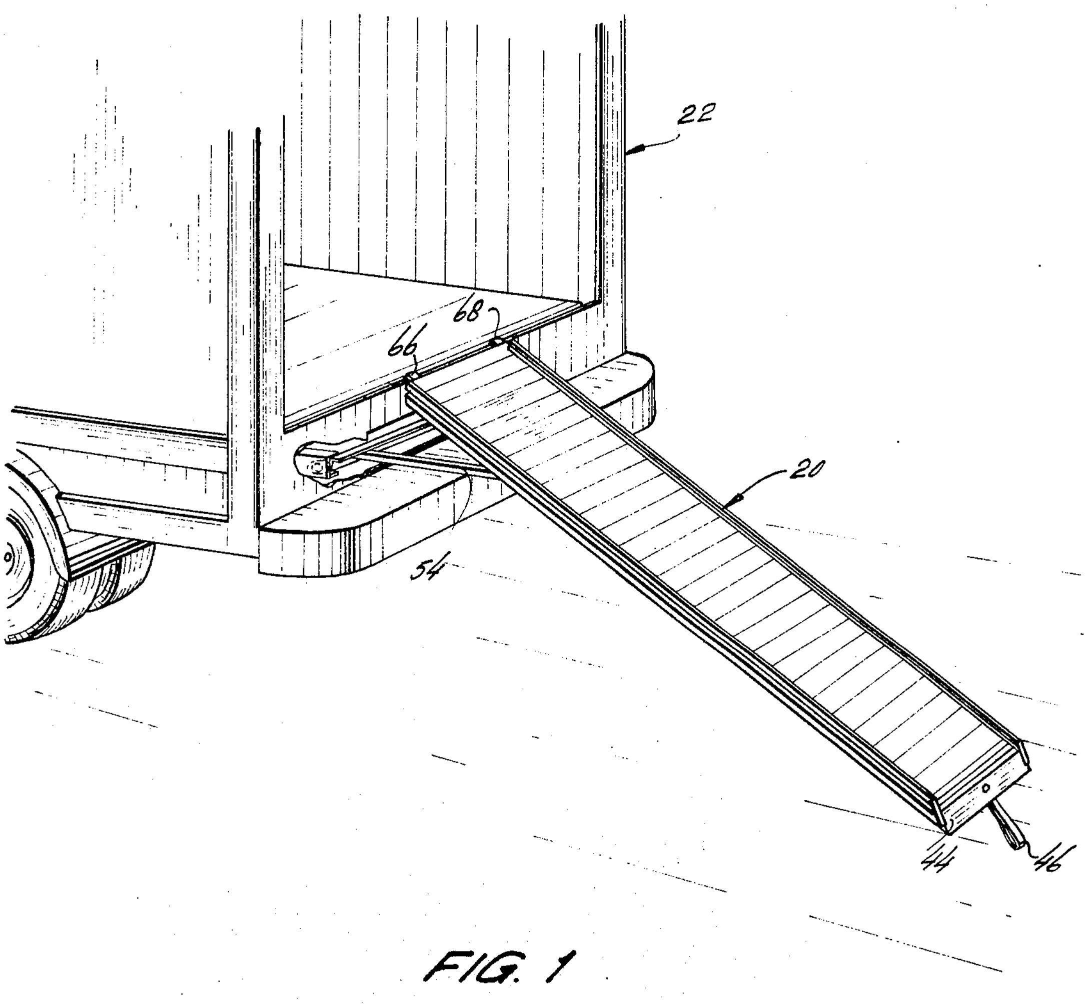
FIG. 1 is a perspective view showing the ramp withdrawn from the truck bed and pivoted downwardly for support upon the ground at one end and hooked to the truck bed at its upper end.

In FIG. 1 a truck 22 is shown with ramp 20 extended from its chassis by means of trolley 54 so that ramp inclined plate 44 and strap handle 46 rest upon the ground.

Figure 2:
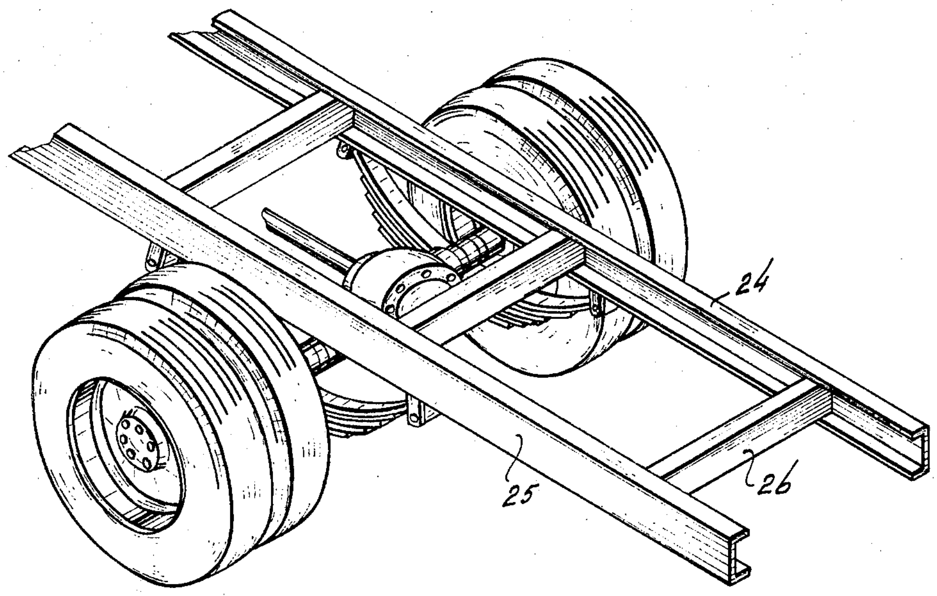
FIG. 2 is a fragmentary perspective view of a conventional truck chassis.

In FIG. 2 there is illustrated a conventional vehicle chassis, embodying longitudinally extending channels 24, 25 and laterally extending trusses or struts 26.

Figure 3:
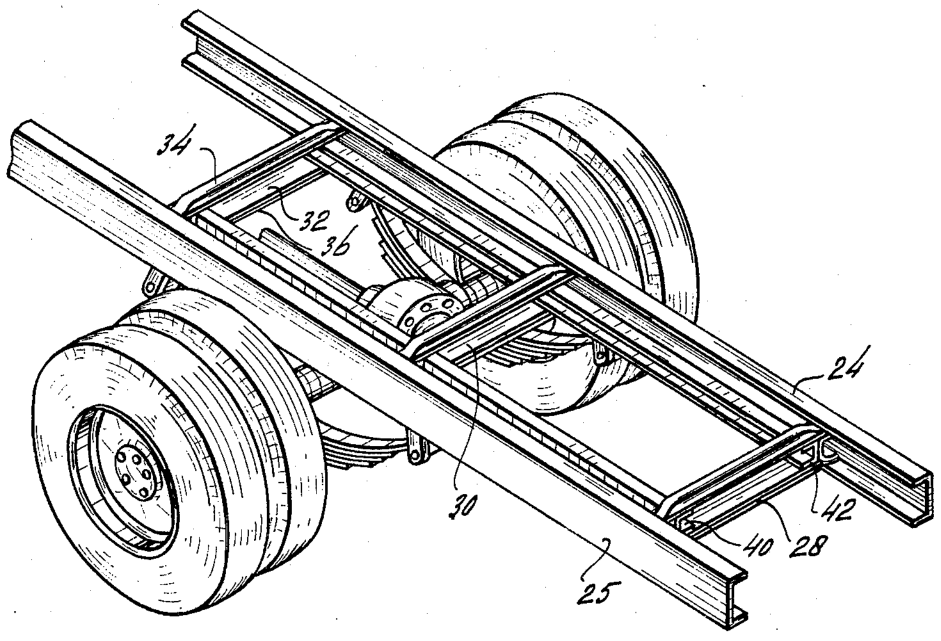
FIG. 3 is a fragmentary perspective view of truck chassis modified according to the present invention, so that its lateral trusses are interiorly opened for supporting the ramp track.

In FIG. 3 the modified vehicle chassis is identical in having longitudinally extending channels 24 and 25. However, the lateral trusses 38, 30 and 32 are modified, so as ta have top transverse web-like members 34 and bottom transverse members 36 supporting ramp tracks 40 and 42.

Figure 4:
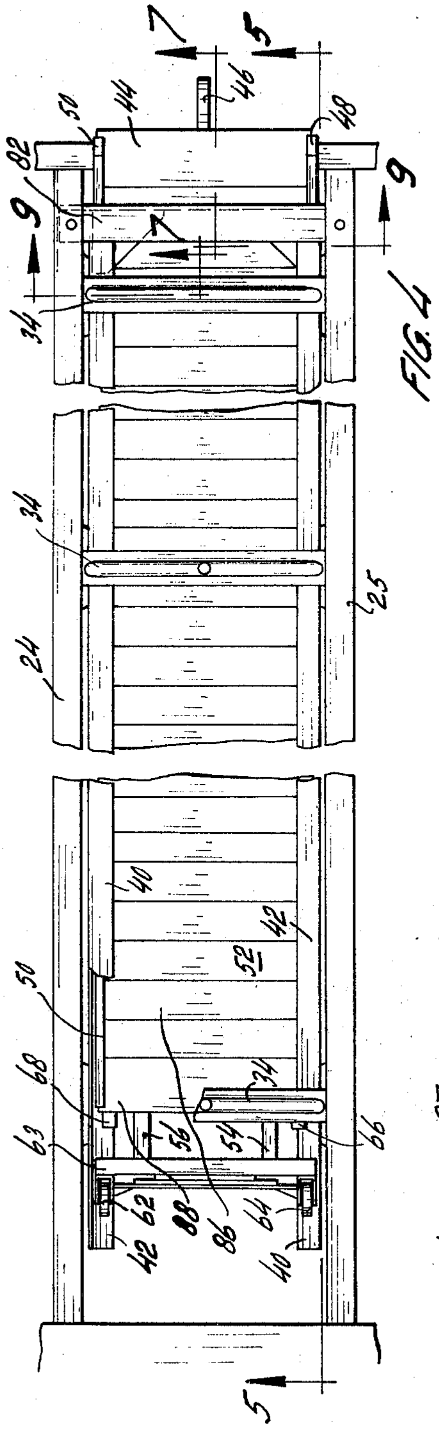
FIG. 4 is a top plan view of the ramp assembly.
Figure 5:
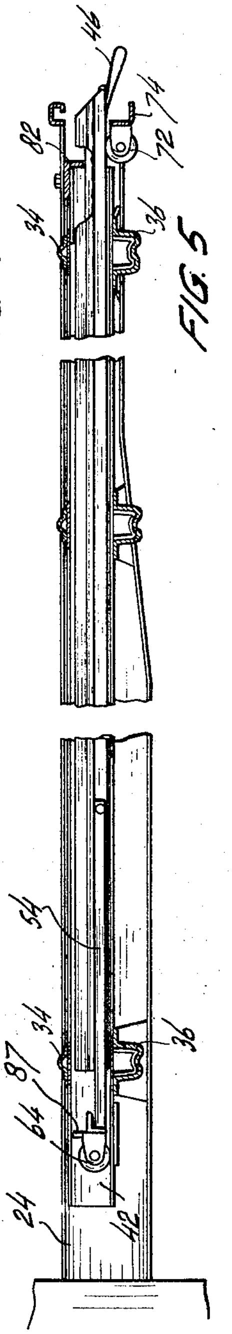
FIG. 5 is a longitudinal sectional view taken along section line 5—5 of FIG. 4.
Figure 6:
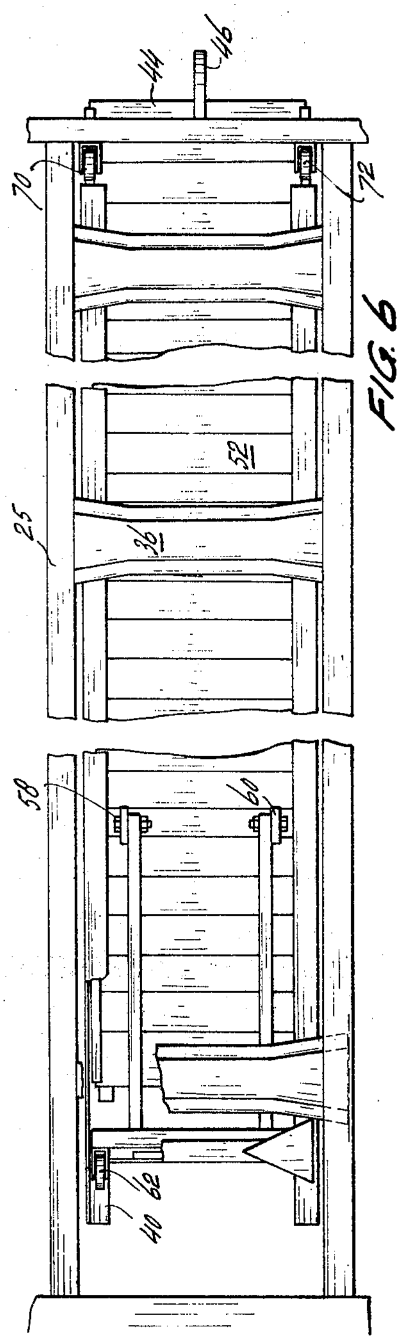
FIG. 6 is a bottom plan.
Figure 7:
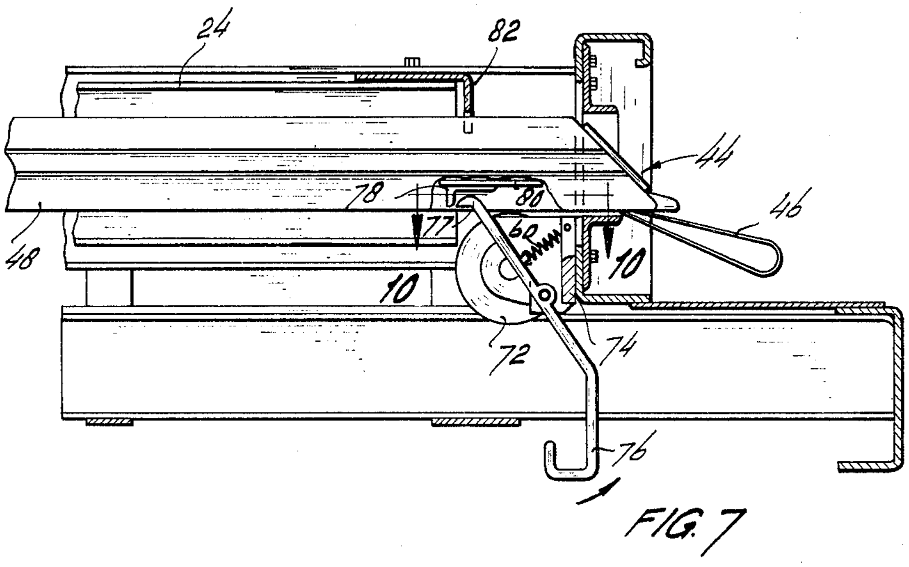
FIG. 7 is a fragmentary vertical section taken along section line 7—7 of FIG. 4.
Figures 11, 12:
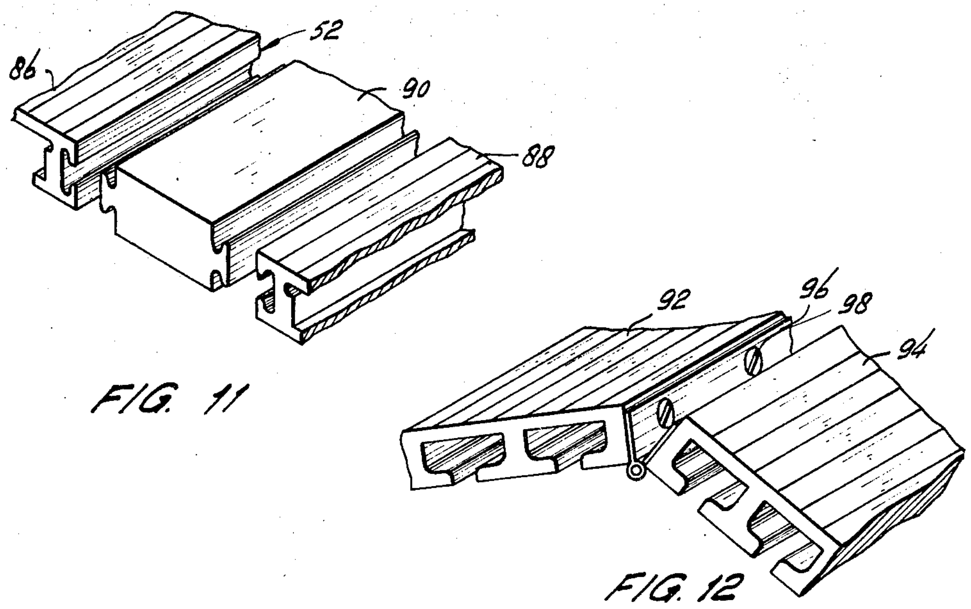
FIG. 11 is an enlarged fragmentary perspective, showing the use of a resilient rib intermediate conventional diecast or extruded ribs in the ramp floor.
FIG. 12 is a fragmentary perspective of a further modification of invention wherein the ramp sections may be hinged one to the other, so as to provide longitudinal resiliency.

In FIGS. 4, 5, and 6 ramp 20 is indicated as comprised of side members 48 and 50 enclosing ramp deck 52 which may be comprised of individual extruded or diecast segments 86 and 88 (illustrated in FIG. 11). Trolley arms 54 and 56 are pivoted to the ramp bottom brackets 58 and 60 and support at their outer end yoke 63 having wheels 62 and 64 engaging the tracks 40 and 42 at either side.

The inner or rear end of the ramp has a pair of hooks 66 and 68 which are engageable with complemental brackets with the truck bed in the ramp inclined position shown in FIG. 1. A pair of rotatable wheels 70 and 72 may be mounted at the rear end of the vehicle so as to engage rotatably the bottom of the ramp as it is withdrawn and pivoted downwardly towards the ground.

As would be apparent, stop 82 depending from the top of the assembly engages yoke plate 87, so as to limit the ramp from total withdrawal from the assembly.

The locking of the ramp assembly in storage position is illustrated in FIGS. 7–10. Lever 76 is pivoted in bracket 74 and tensioned by spring 60, so that its tip end 77 abuts angle bracket 78 attached to plate 80. By pivoting lever 76 counter-clockwise tip end 77 is lowered beneath bracket 78, so that the ramp may be withdrawn by pulling upon strap 46. Alternatively, a channel 78' may be used instead of angle 78, as illustrated in FIG. 2.

Figure 9:
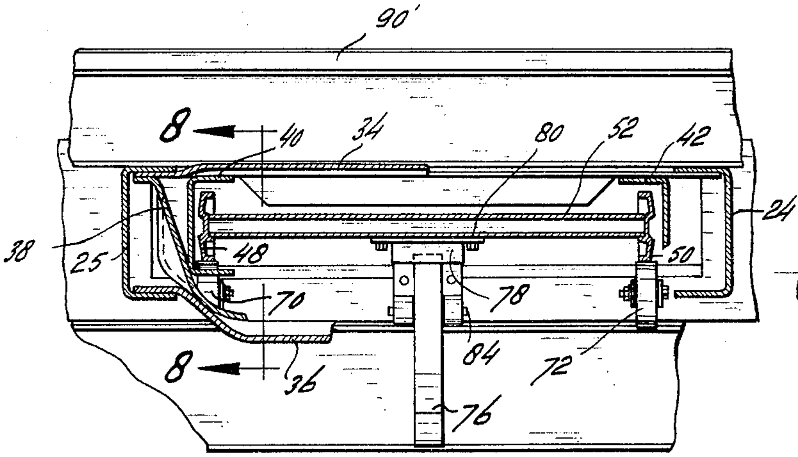
FIG. 9 is a transverse section taken along section line 9—9 of FIG. 4.
Figure 8:
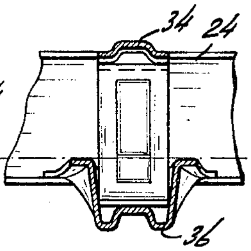
FIG. 8 is a fragmentary section taken along section line 8—8 of FIG. 9.
Figure 10:
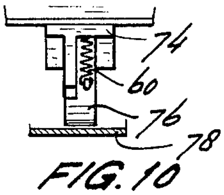
FIG. 10 is a transverse section taken along section line 10—10 of FIG. 7.

The lateral truss assembly is more particularly illustrated in FIG. 9. The outer ends of top web member 34 and bottom web members 38 and 36 are welded to the tops and bottoms of the channels 25 and 24. This provides strength equivalent to the conventional struts 26, illustrated in FIG. 2.

Figures 13, 14:
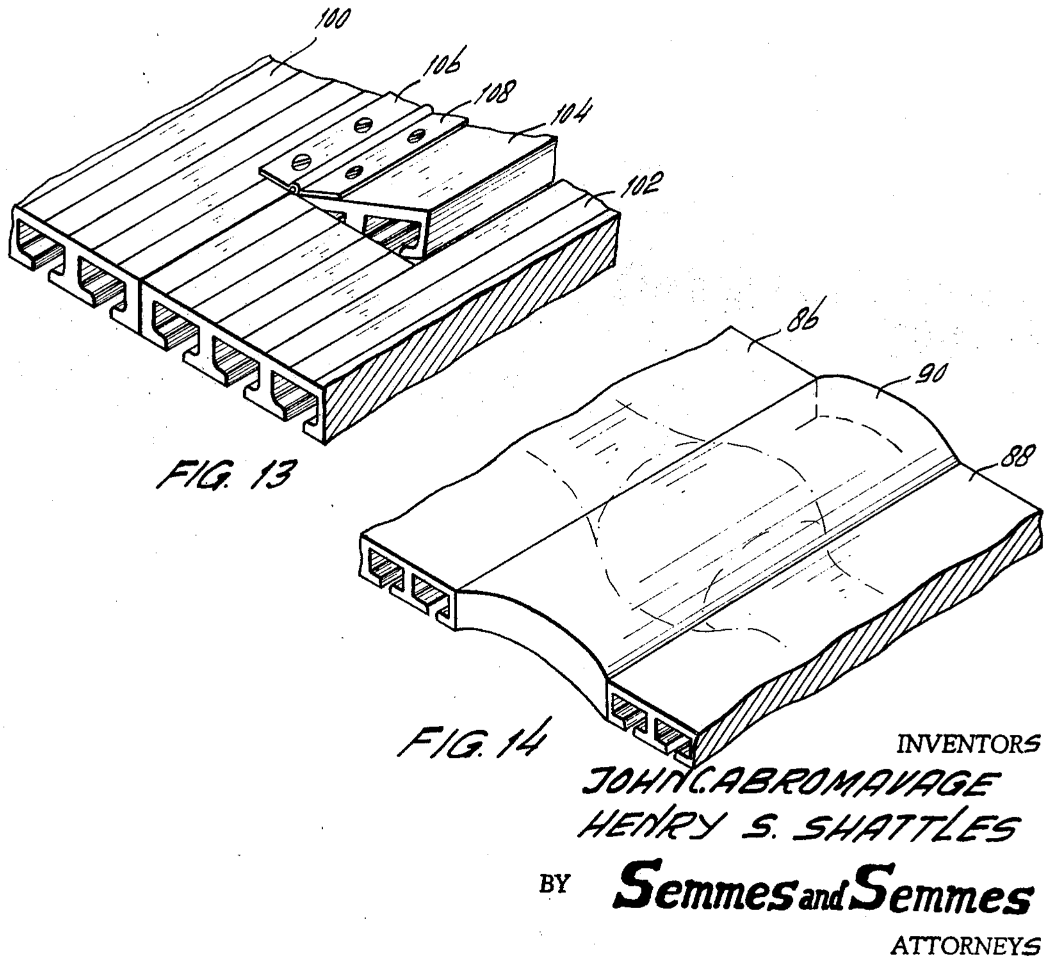
FIG. 13 is a fragmentary perspective of a further modification of invention wherein a ramp section has a hinged segment, so as to provide longitudinal resiliency.
FIG. 14 is a fragmentary perspective of the modification according to FIG. 11, showing a ramp mid-section resiliently engaging the vehicle chassis shown in phantom.
Figures 15, 16, 17:
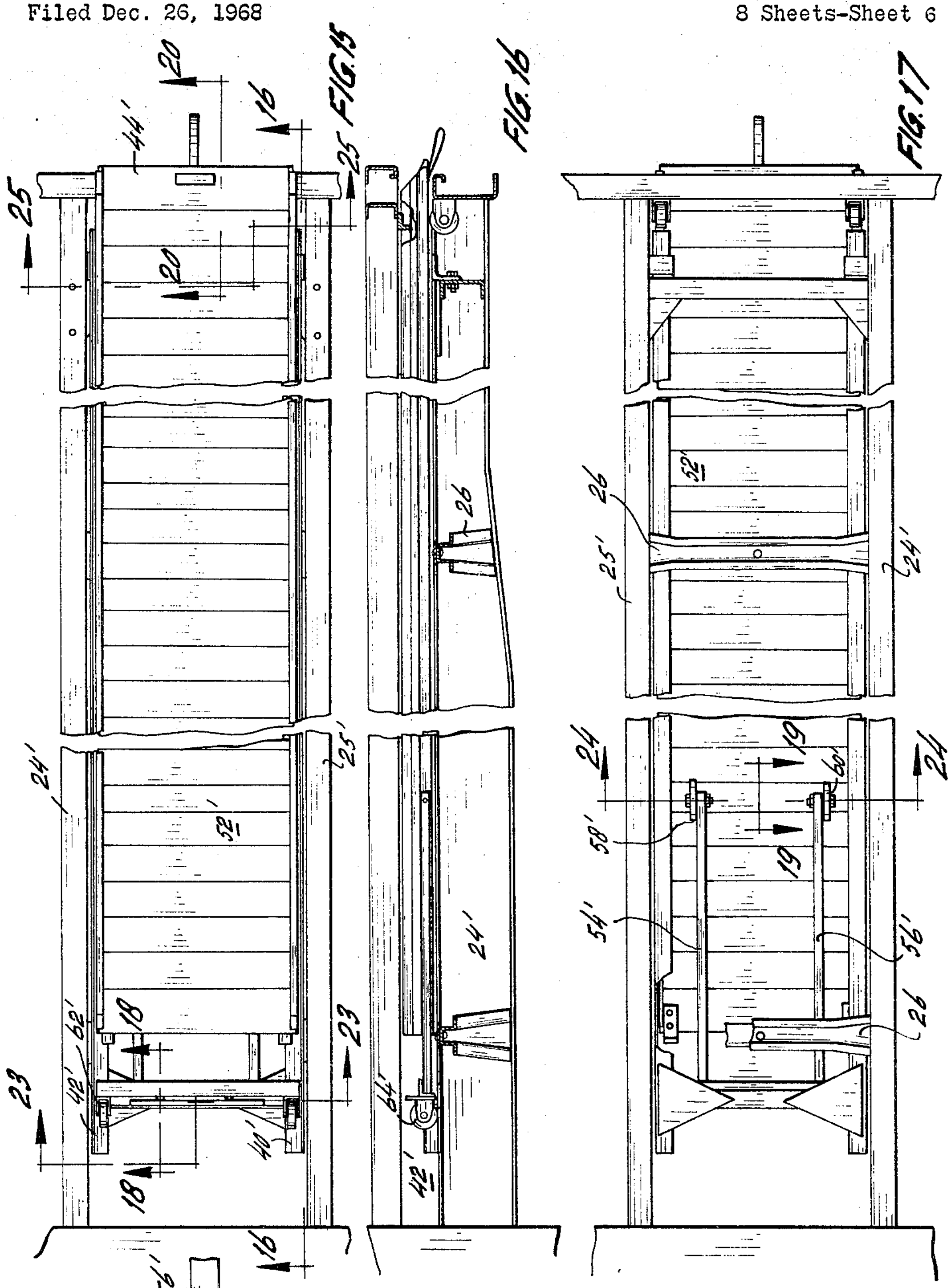
FIG. 15 is a top plan of a modification where the ramp assembly is supported on top of the truck chassis.
FIG. 16 is a longitudinal section view taken along section line 16—16 of FIG. 15.
FIG. 17 is a bottom plan.
Figures 18, 19:
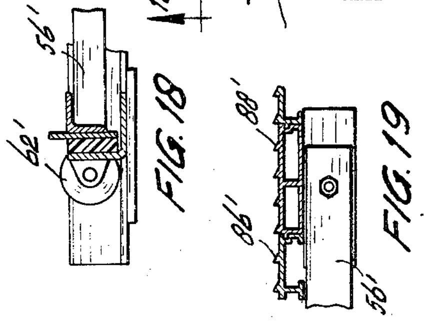
FIG. 18 is a transverse sectional view taken along section line 18—18 of FIG. 15.
FIG. 19 is a fragmentary vertical section taken along section line 19—19 of FIG. 17.
Figure 20:
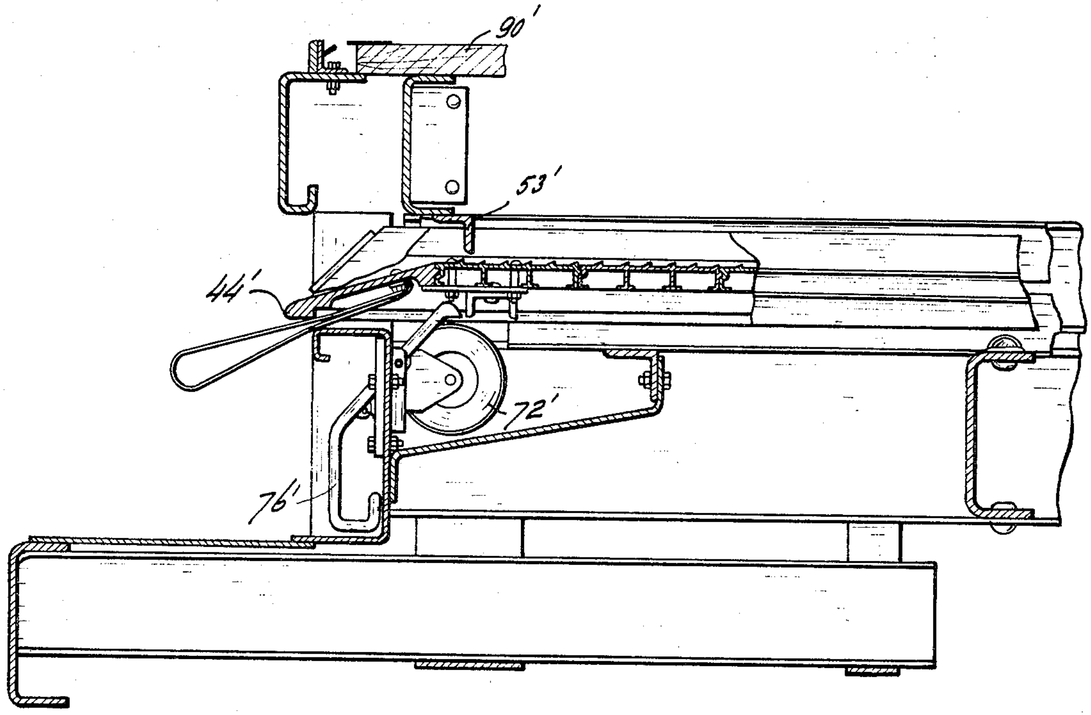
FIG. 20 is a vertical fragmentary section, taken along section line 20—20 of FIG. 15.
Figure 21:
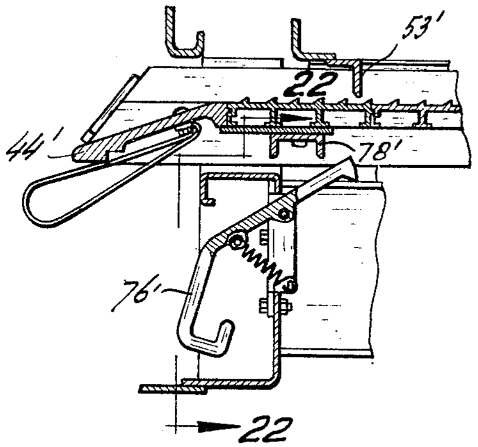
FIG. 21 is a like vertical section, showing the locking member opened, so as to permit withdrawal of the ramp assembly.
Figure 22:
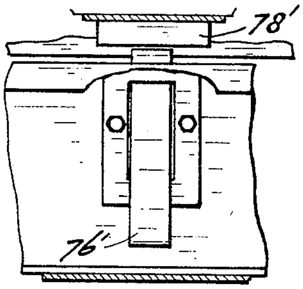
FIG. 22 is a fragmentary transverse section taken along section line 22—22 of FIG. 21.
Figure 23:
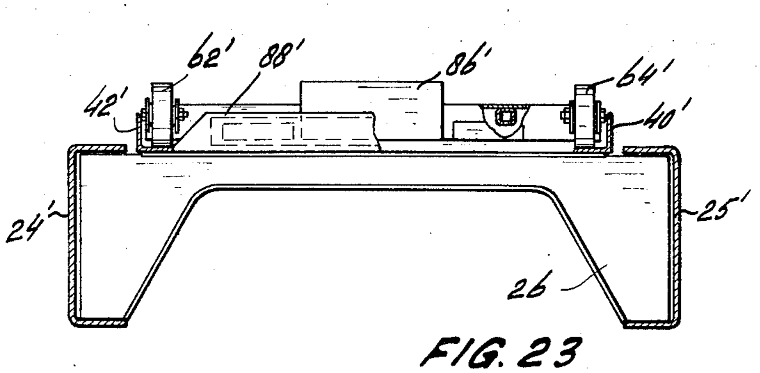
FIG. 23 is a transverse section taken along section line 23—23 of FIG. 15.
Figure 24:
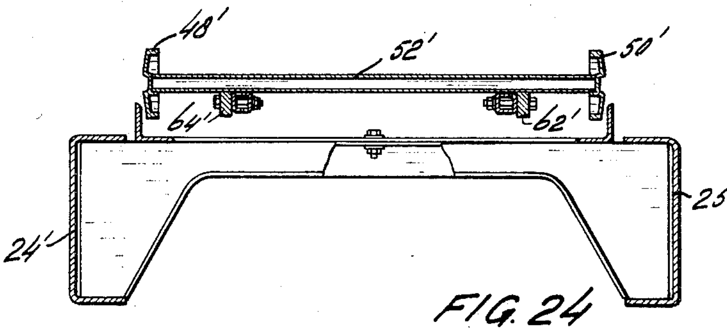
FIG. 24 is a transverse section taken along section line 24—24 of FIG. 17.
Figure 26:
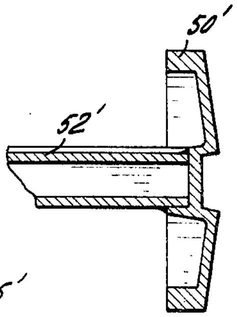
FIG. 26 is a fragmentary section showing the fitting of the ramp deck in the extruded side members.
Figure 25:
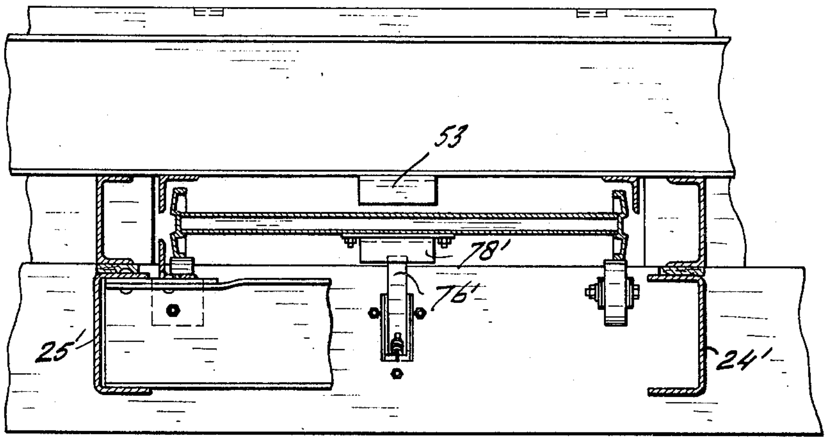
FIG. 25 is a vertical section taken along section line 25—25 of FIG. 15.

FIGS. 11–14 depict the employment of resilient transverse members in the ramp floor 52. In FIGS. 11 and 14 transverse members 90 are made of rubber or any flexible plastic member such as neoprene so as to frictionally engage and rest upon the vehicle differential, shown in phantom. Flexible members 90 are installed to prevent ramp damage as the vehicle travels over an uneven road, the differential hits the ramp. The flexible transverse member 90, as it engages the differential, absorbs the bumping shock without jarring the ramp assembly. This concept is carried over into the FIG. 12 modification wherein transverse sections 92 and 94 are hingedly secured to each other by hinge member 96 having screws 98. A single hinge concept is illustrated in FIG. 13, wherein die cast segment 100 and partial die cast segment 102 support hinge 106 by means of screws 108 and internal hinge segment 104 may abut the vehicle differential.

The modification illustrated in FIGS. 20–25 may be employed where space-saving is not a critical factor. In this modification the entire ramp assembly is mounted above the conventional chassis members 24' and 25'. The vehicle truck bed 90' may be supported above the entire assembly. Identical rear lock element 76' is provided as is rear rotatable wheel 72'.

As illustrated in FIGS. 15–19, the ramp employs identical trolley arm and track members, except that the tracks 40' and 42' are mounted above the transverse truss 26.

Manifestly, the assembly may be varied in its structural features without departing from the spirit and scope of invention as defined in the claims.

We claim:

1. In a vehicle of the type having longitudinally extending chassis members, a ramp assembly comprising:

(A) a plurality of internally opened truss members laterally interconnecting said chassis members;

(B) a track member supported longitudinally within said truss members; and (C) a ramp extending through said truss members and having:

(i) a wheeled member pivoted to a forward end of said ramp and engaging said track beneath said ramp.

2. In a vehicle of the type having longitudinally extending chassis members, a ramp assembly as in claim 1, said vehicle including a stop member engaging the forward end of said ramp, as said ramp is withdrawn upon said track and from the rear of said vehicle.

3. In a vehicle of the type having longitudinally extending chassis members, as in claim 2, said ramp including at its forward end:

(ii) a hook member engageable with the vehicle, so as to secure said ramp to said vehicle at its forward end while the rear end of said ramp rests upon the ground.

4. In a vehicle of the type having longitudinally extending chassis members, a ramp assembly comprising:

(A) a plurality of internally opened truss members laterally interconnecting said chassis members;

(B) a pair of track members extending through said truss members; and (C) a ramp extending through said truss members above said track members and having:

(iii) a trolley pivoted to the forward underside of said ramp and having a pair of wheels engaging said tracks.

5. In a vehicle of the type having longitudinally extending chassis members, as in claim 4, said truss members including:

(i) a top member extending over the track and ramp assembly; and (ii) a bottom member extending beneath said track and ramp assembly.

6. In a vehicle of the type having longitudinally extending chassis members as in claim 5, said ramp assembly including:

(iv) wheel pivots supported in said vehicle and rotatably engageable with the bottom of said ramp, as it is withdrawn longitudinally from said track.

7. In a vehicle of the type having longitudinally extending chassis members, as in claim 6, said ramp having:

(v) a resilient mid-section complementally engageable with a portion of said vehicle beneath said chassis.

8. In a vehicle of the type having longitudinally extending chassis members, a ramp assembly comprising:

(A) a pair of tracks supported upon said chassis members and extending in parallel therewith;

(B) a ramp supported intermediate said tracks and having pivoted at its forward end:

(i) a pair of wheel members engaging said tracks, as said ramp is withdrawn upon said tracks from the rear of said vehicle; and (C) a stop mounted in the vehicle rear and engageable with said pair of wheel members, so as to limit withdrawal of the entire ramp assembly from said vehicle; and (D) a hook member engageable with the vehicle, so as to secure said ramp to said vehicle at is forward end while the rear end of said ramp rests upon the ground.

9. In a vehicle of the type having longitudinally extending chassis members, as in claim 6, said ramp assembly including:

(vi) a stop member supported in the rear of said vehicle so as to engage said trolley as a limit to withdrawal of the ramp assembly from said vehicle.

10. In a vehicle as in claim 9, said ramp assembly including:

(vii) a locking member supported in said vehicle and engaging the rear end of said ramp, so as to lock selectively said ramp within said track.

References Cited

UNITED STATES PATENTS

| | | | |
|---|---|---|---|
| 1,699,882 | 1/1929 | Ferguson | 214—85 |
| 2,370,427 | 2/1945 | Sherry | 214—85 |

ALBERT J. MAKAY, Primary Examiner

U.S. Cl. X.R.

14—71